United States Patent [19]

Nimerick et al.

[11] Patent Number: 5,229,017
[45] Date of Patent: Jul. 20, 1993

[54] METHOD OF ENHANCING METHANE PRODUCTION FROM COAL SEAMS BY DEWATERING

[75] Inventors: Kenneth H. Nimerick; Jerald J. Hinkel, both of Tulsa, Okla.

[73] Assignee: Dowell Schlumberger Incorporated, Tulsa, Okla.

[21] Appl. No.: 487,370

[22] Filed: Mar. 1, 1990

[51] Int. Cl.$^5$ .................................. E21B 43/26
[52] U.S. Cl. .................. 252/8.551; 299/12; 44/626; 166/308
[58] Field of Search ............... 299/12; 44/626; 166/308; 252/8.551; 568/601

[56] References Cited

U.S. PATENT DOCUMENTS 4,330,481 5/1982 Timberlake et al. ............... 260/463

FOREIGN PATENT DOCUMENTS 1483537 8/1977 United Kingdom .

OTHER PUBLICATIONS

Jeffrey et al "Hydraulic Fracturing to Enhance Production of Methane from Coal Seams" University of Alabama Tuscaloosa Coalbed Methane Symposium Proceedings Apr. 17 to 20, 1989 pp. 385-394.

Primary Examiner—Gary Geist
Attorney, Agent, or Firm—Stephen A. Littlefield

[57] ABSTRACT

Dewatering of coal seams for facilitating the production of gas therefrom through a well is effected by treating the coal seam utilizing a well treatment fluid containing a dewatering aid which both enhances the permeability of the formation to water production and binds tenaciously to the coal surface so that the permeability enhancement benefits are realized over a long production term. The preferred dewatering surfactants used in the treatment fluid and the process of treating the well are selected from a group consisting of:

(a) organic surfactant compounds having the formula $$R_1-O([EO]_x-[PO]Y-[BO]_z)H$$

wherein $R_1$ is an alcohol, phenol or phenol derivative or a fatty acid having 1 to 16 carbon atoms; EO is an ethylene oxide radical and x is 1 to 20; PO is a propylene oxide radical and y is 0 to 15 and BO is a butylene oxide radical and z is 1-15;

(b) an organic polyethylene carbonate having the formula $$R_2-O(-CH_2-CH_2-O-\overset{\overset{O}{\|}}{C}-O-CH_2-CH_2-)_qH$$

wherein $R_2$ is an alcohol having 7 to 16 carbon atoms and q is 7 to 16;

(c) butoxylated glycols having 1 to 15 butylene oxide groups, and (d) ethoxylated-butoxylated glycols having 1 to 5 ethylene oxide groups and 5 to 10 butylene oxide groups. The well treatment fluid may be used in both fracturing and workover operations to enhance and maintain fracture conductivity over an extended period of production.

6 Claims, 6 Drawing Sheets

METHOD OF ENHANCING METHANE PRODUCTION FROM COAL SEAMS BY DEWATERING

This invention relates to the art of recovery of natural gas from coal seams and, more particularly, to a well treatment fluid and method of treating a well which enhances the dewatering of a coal seam so that methane production therefrom is facilitated.

BACKGROUND OF THE INVENTION

The presence of methane in subterranean coal deposits represents both a hazard and an economic benefit. In the mining of coal, the presence of poisonous methane gas is both a human health hazard and offers a high potential for explosion and fire. In the past, coalbed methane has been vented to the atmosphere and/or flared prior to the mining of the coal in order to reduce such hazards.

In recent times, it has been recognized that the venting of methane is both an economic waste and a large source of environmental pollution. The recovery of coalbed methane has thus become economically beneficial as a source of revenue as well as environmentally beneficial through a reduction in the amount of hydrocarbons released directly to the atmosphere. In this regard, it has become somewhat commonplace to recover methane from coal deposits in a manner substantially identical to normal natural gas production, i.e., drilling and completing a gas well into the coal seam and fracturing the well within the coal formation to enhance methane recovery.

One difficulty encountered with the recovery of methane from fractured or unfractured coal seams is that many coal reservoirs are water saturated. The bulk of the methane present in the coal seam is adsorbed onto the coal surface. For this reason, it is necessary to first remove a large portion of the water in the reservoir which results in a lowering of the reservoir pressure to a point whereby desorption of the methane from the coal surface occurs at a substantial rate. The relationship between pressure and desorption rate is known as the desorption isotherm. The desorption isotherm will vary from one coal to another. Because of this phenomenon, long periods of dewatering are generally required before methane production reaches a maximum rate.

The flow of water through the pores and fractures of a coal reservoir is significantly influenced by chemical adsorption of the water onto the surface of the coal. In most virgin, high-grade coal deposits, the coal surface is uncharged and the movement of water is restricted only by physical relationships. Physical restrictions result from either the viscosity of the flowing phase or the interfacial tension between the water and the coal. The presence of fines within a fracture, particularly at the fracture extremities, can result in restricted flow of the water into and within the fracture.

Fines are often observed during well production. Many of these fines are probably generated near the wellbore by mechanical failure of the coal. It is also likely that some of these fines originate from weathering of the coal seam in the vicinity of the fracture because of changes in the downhole environment resulting from stimulation, production and periodic workovers. Processes that lead to the development of fines include dehydration, oxidation, proppant embedment and changes in the in situ stresses within the coal seams. These fines tend to migrate within the fractures during the fracturing process and concentrate at the fracture tips restricting the flow of water in and through the fracture.

Air dissolved in the fluids which are introduced to the coal seams during the fracturing treatment and other well operations may also result in oxidation of the coal surface. In addition to generating fines, oxidation will also change the normally hydrocarbon-wet and electrically neutral surface of the coal to a surface that is water-wet and electro-negative, thereby inhibiting the dewatering process.

Wettability changes in the coal surface may also result from the choice and use of surfactants in stimulation or workover fluids. In a manner similar to weathering, surfactants may affect the coal surface and lead to changes in the relative permeability of the coal which can affect both the water drainage rate and fluid saturation level of the coal, either advantageously or detrimentally.

In an attempt to improve the dewatering of subterranean coal seams to effect the desorption and production of associated gas, a study has been made in order to identify surfactants which enhance the dewatering process while avoiding damaging the surface characteristics and relative permeability of the coal reservoir. Likely candidates for selection of a beneficial surfactant are the class of chemicals used as dewatering or filtering aids in the process of beneficiation of mined minerals such as metallic ores and coal. These processes typically involve the grinding of the mineral-containing material and flocculation and flotation so that the desired minerals are concentrated in a water slurry which is then filtered to remove the water.

Surfactants which have proven beneficial in the removal of water from filter cakes in mineral beneficiation processes include polyoxyethylene ethers of a hexitol anhydride partial long-chain fatty acid ester such as described in U.S. Pat. No. 2,864,765; oxyalkylated surfactants such as described in U.S. Pat. No. 3,194,758, 4,156,649 and 4,206,063. Other beneficial dewatering surfactants include dialkylsulphosuccinates such as described in U.S. Pat. No. 4,097,390 and 4,146,473. While use of these filtration and dewatering aids is suggested by their beneficial properties in dewatering of slurried fines under atmospheric pressure conditions, their use in a pressurized, porous subterranean environment has met with considerably less success.

One material which has met with limited success in subterranean use is a fluorinated alkyl quaternary ammonium iodide surfactant system such as described in U.S. Pat. No. 4,028,257. While this material has shown beneficial results in the initial dewatering of coal seams, the dewatering benefits gradually decline over time apparently due to leaching of the surfactant from the coal surface due to the passage of fluids through the pores and fractures to the wellbore.

SUMMARY OF THE INVENTION

The present invention provides a well treatment fluid and method of treating a well which incorporates a group of surfactants which have been found to greatly benefit the dewatering process and, additionally, offer the advantage of being tenaciously bound to the coal surface so that the benefits of their presence on the coal surface can be realized over a long period of formation dewatering.

In accordance with the invention, a process for recovering natural gas from a subterranean coal reservoir through a wellbore penetrating the coal reservoir comprises pumping into the reservoir, a well treatment fluid comprising an aqueous carrier fluid and an effective amount of a dewatering surfactant selected from a group consisting (a) organic surfactant compounds having the formula

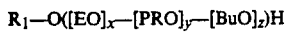

wherein $R_1$ is an alcohol, phenol or phenol derivative or a fatty acid having 1 to 16 carbon atoms, EO is an ethylene oxide radical and x is 1 to 20, PrO is a propylene oxide radical and y is 0 to 15 and BuO is a butylene oxide radical and z is 1 to 15;

(b) an organic polyethylene carbonate having the formula

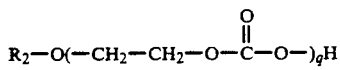

wherein are $R_2$ is an alcohol having 7 to 16 carbon atoms and q is 7 to 16;

(c) butoxylated glycols having 1 to 5 butylene oxide groups and (d) ethoxylated-butoxylated glycols having 1 to 5 ethylene oxide groups and 5 to 10 butylene oxide groups.

Further in accordance with the invention, the well treatment fluid is pumped at a pressure sufficient to fracture the formation.

Further in accordance with the invention, the above process of fracturing includes providing a well treatment fluid including a proppant and pumping the fluid at a pressure sufficient to fracture the formation.

Still further in accordance with the invention, a well treatment fluid for fracturing or workover of a subterranean formation comprises an aqueous carrier fluid and an effective amount of a dewatering surfactant selected from a group consisting of (a) organic surfactant compounds having the formula

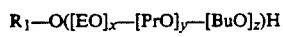

wherein $R_1$ is an alcohol, phenol or phenol derivative or a fatty acid having 1 to 16 carbon EO is an ethylene oxide radical and x is 1 to 20. PrO is a propylene oxide radical and y is 0 to 15 and BuO is a butylene oxide radical and z is 1 to 15;

(b) an organic polyethylene carbonate having the formula

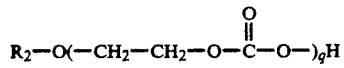

wherein are $R_2$ is an alcohol having 7 to 16 carbon atoms and q is 7 to 16;

(c) butoxylated glycols having 1 to 5 butylene oxide groups and (d) ethoxylated-butoxylated glycols having 1 to 5 ethylene oxide groups and 5 to 10 butylene oxide groups.

Still further in accordance with the invention, the above well treatment fluid is a fracturing fluid which further includes a proppant.

It is therefore an object of this invention to provide a well treatment fluid which assists in the dewatering process and the release of associated gas through a well penetrating a subterranean coal reservoir.

It is yet another object of this invention to provide a well treatment fluid for both well fracturing and workover which includes a dewatering aid which tenaciously binds to a subterranean coal surface in order to effect long-term benefits in the dewatering of coal reservoirs.

BRIEF DESCRIPTION OF THE DRAWINGS

These and other objects of the invention are accomplished through the manner and form of the present invention to be described hereinafter in conjunction with the accompanying drawings forming a part of this specification and in which FIGS. 1-6 graphically illustrate the results of pressurized flow testing of various surfactant materials, the Figures illustrating the advantages of the preferred embodiments of the present invention.

DETAILED DESCRIPTION OF THE PREFERRED EMBODIMENTS AND THE DRAWINGS

Figure 1:
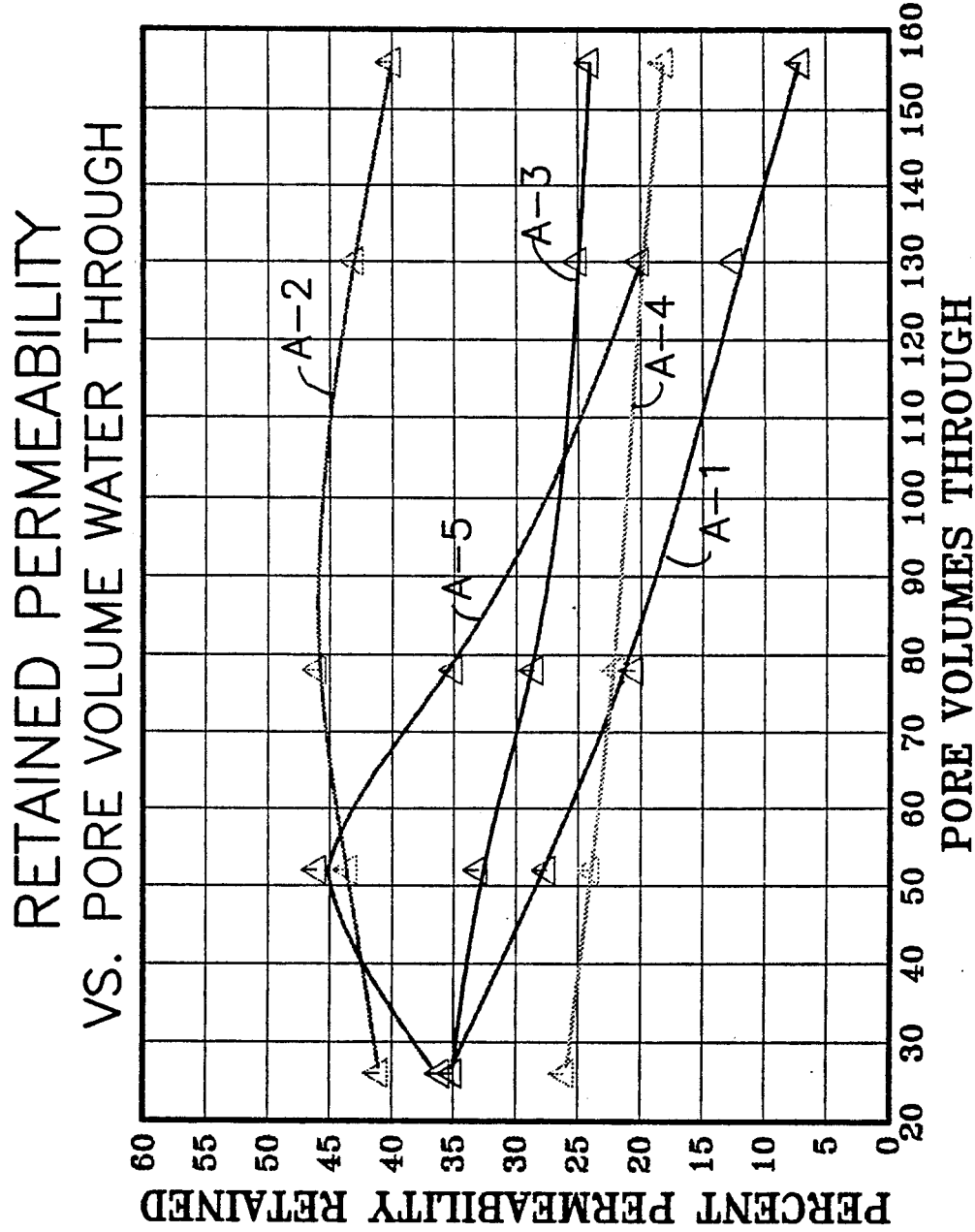

The present invention is described hereinafter in the more limited aspects of preferred embodiments thereof. It will be understood that such preferred embodiments are presented for the purposes of illustrating the invention only and not for the purposes of limiting the scope of the invention in any way.

In the process of recovering natural gas, principally methane, from subterranean coal reservoirs, a wellbore is drilled to the subterranean coal seam and completed and perforated in a manner substantially identical to the procedure for drilling and completing a normal subterranean gas well. In order to stimulate production of subterranean fluids (liquids and gases) to the wellbore, it is common practice to fracture the formation and this procedure is also beneficial in the dewatering and production of gas from subterranean coal reservoirs.

Fracturing fluids typically comprise an aqueous or oil-based liquid carrier fluid which is commonly viscosified to improve its rheological and proppant-carrying properties typically using a polysaccharide polymer such as a cellulosic polymer or a galactomannan gum. Common materials used in the viscosifying of fracturing fluids comprise cellulose and cellulose derivatives such as hydroxyethyl cellulose, carboxymethyl hydroxyethyl cellulose and the like and guar and modified guar gums such as hydroxypropyl guar, carboxymethyl hydroxypropyl guar and the like. Such viscosifiers or gelling agents may additionally be crosslinked in order to further increase their proppant-carrying capacity and improve their rheological properties as is known in the art using various crosslinking materials such as borates, titanates, zirconates, aluminates and the like. Such fracturing fluids also employ gel breaking agents in order to break the gels and assist in the return of the fracturing fluids to the wellbore once a fracturing operation has been completed.

In addition to the use of the above fracturing fluid compositions, it is also common to employ a gas with the fracturing fluid to either energize or foam the fracturing fluid, the gas acting to further assist in the well clean-up process following breaking of the gel.

In the process of fracturing subterranean coal formations, primarily aqueous fracturing fluids are used which may be thickened by either crosslinked or uncrosslinked gelling agents as described above and may further include gaseous energizing or foaming materials such as carbon dioxide and/or nitrogen.

In a typical fracturing process, the fracture is initiated by pumping a low viscosity aqueous fluid with good to moderate leak-off properties, low polymer loadings and, typically, no proppant into the formation. This initial fluid, typically referred to as a "pad", is followed by a fracturing fluid of higher viscosity carrying initially low quantities and then gradually increasing quantities of proppant into the extended fractures. Once the proppant has been placed in the fractures, fracturing pressure is released and the fractures partially close against the proppant which retains the fractures in a partially open, high permeability condition.

Wells which have been previously fractured and/or wells having initial high permeability may show a decrease in production over time due to formation and/or fracturing plugging due to various well conditions such as fines migration, oxidation and the like. In these instances, it is common to employ a so-called workover fluid in order to remediate the detrimental condition in the well. Workover fluids may simply comprise water used to flush out the flow channels in the reservoir or an acid solution which may dissolve detrimental deposits. Either of these fluids may include low polymer loading and are conducted at pressures below fracturing pressures so as to avoid disturbing a proppant pack within fractures of the formations.

As stated previously, coal reservoirs are commonly water-saturated and it is necessary to remove the water through production to the wellbore prior to any reasonable amounts of associated gas being produced. In accordance with the invention, an aqueous well treatment fluid for use in both workover operations and in fracturing coal seams includes a dewatering aid for facilitating the desorption of water through the pores and the fractures of the coal formation to the wellbore. In accordance with the invention, the dewatering aid is an organic surfactant selected from a group consisting of (a) organic surfactant compounds having the formula

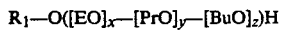

wherein $R_1$ is an alcohol, phenol or phenol derivative or a fatty acid having 1 to 16 carbon atoms, EO is an ethylene oxide radical and x is 1 to 20. PrO is a propylene oxide radical and y is 0 to 15 and BuO is a butylene oxide radical and z is 1 to 15;

(b) an organic polyethylene carbonate having the formula

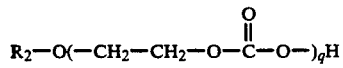

wherein are $R_2$ is an alcohol having 7 to 16 carbon atoms and q is 7 to 16;

(c) butoxylated glycols having 1 to 5 butylene oxide groups and (d) ethoxylated-butoxylated glycols having 1 to 5 ethylene oxide groups and 5 to 10 butylene oxide groups.

The surfactants of the present invention are adsorbed onto the coal surfaces thereby increasing the hydrophobicity of the coal. The preferred surfactants also are relatively tenaciously bound to the coal surfaces thereby preventing re-wetting and re-adsorption of water on the coal surfaces by the passage of subsequent volumes of water through the formation drainage process. This feature of the surfactants offers the additional advantage that, since the surfactants are tenaciously bound to the coal, minor, if any, amounts are contained in the produced water thereby greatly reducing any environmental discharge problems associated with the produced water. Further, the surfactants of this invention inhibit the migration of fines within the fracture thereby additionally enhancing and maintaining fracture conductivity.

Testing was conducted to determine how various potential additives performed under conditions of pressurized flow. The purpose of these tests was to determine if higher flow rates would cause fines to migrate in the fractures and to determine the permeability of a fines pack as a function of the pore volume of water flowing through the pack. To be most effective, any dewatering aid should resist removal from the surface of the coal by being tenaciously bound thereto. The preferred dewatering aids enhance the conductivity of a coal seam fracture but, most importantly, maintain that conductivity over an extended period of production.

The testing comprised flowing fluids under pressure through packs of fine coal. One inch inside diameter plexiglass tubes were filled with 100 grams of dry coal fines. With the bottom end of the tubes opened, water was flowed vertically downwardly through the coal and any air above the coal was bled off. Water pressure was increased to 20 psi and the tubes were tapped in order to compact the coal column. After stable flow was achieved, the permeability of the coal pack was determined. Using a syringe, approximately two pore volumes (100 cc) of water containing 1000 to 4000 ppm by volume (1 to 4 gallons per thousand gallons of water) of the selected surfactant was added to the top of the column. The plots of FIGS. 1 through 6 illustrate the effects of the surfactants tested on the permeability of the coal pack over an untreated coal pack versus the number of pore volumes of water flowed through the pack. This plot serves as an indication of the relative tenacity with which each surfactant is bonded to the coal surface and also as a relative measure of the effectiveness of each surfactant on the enhancement of the permeability of the coal pack as compared with other surfactant materials.

FIG. 1 illustrates a plot of the testing of four ethylene oxide, butylene oxide substituted alcohols in comparison with a prior art standard. Plot A-1 represents the testing of a fluorinated alkyl quaternary ammonium iodide surfactant system such as described in U.S. Pat. No. 4,028,257 which has been commonly used in coal-bed dewatering applications. As can be seen from FIG. 1, this material shows a substantial decrease in the permeability enhancement over time. It is speculated that this decrease in the permeability enhancement effect is a result of the leaching of the surfactant material from the coal surface by the passage of water flowing through the pack. Additional materials tested against this standard shown in FIG. 1 comprise ethanol with 3.2 ethylene oxide and 9.0 butylene oxide adducts (line A-2), tridecyl alcohol having 7.5 ethylene oxide and 1.8 butylene oxide adducts (line A-3); butanol having 10 ethylene oxide and 6 butylene oxide adducts (line A-4) and methanol having 3.1 ethylene oxide and 8.5 butylene oxide adducts (line A-5). It can be seen that all of these materials are more tenaciously bound to the coal surface since permeability decreases at a much slower rate due to the passage of water through the column than the prior art standard. A larger percentage of the initial permeability enhancement is retained throughout the test.

Figure 2:
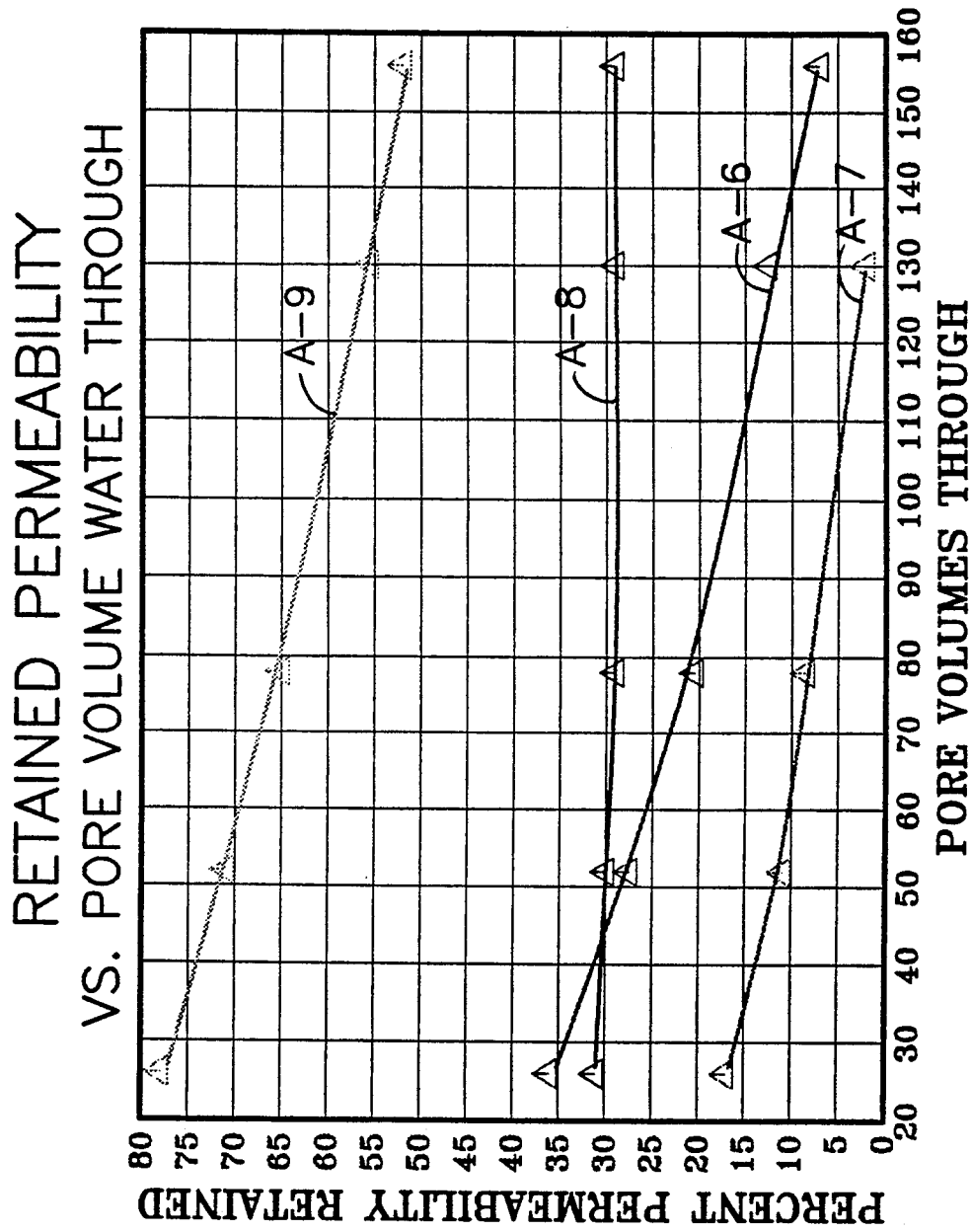

FIG. 2 illustrates the testing of three additional ethylene oxide, butylene oxide substituted alcohols against the same prior art standard fluoro surfactant (line A-6). The poor performance of tridecyl alcohol having 6.5 ethylene oxide adducts (line A-7) illustrates the importance of the presence of butylene oxide in the substituted alcohol. Not only does this material lack tenacious binding to the coal surface, the initial permeability enhancement in the coal pack is substantially less than that of the prior art standard. Butanol having 3.3 ethylene oxide and 5 butylene oxide adducts (line A-8) shows extremely tenacious binding of the surfactant to the coal surface and long-term retained permeability enhancement. Di-secondarybutylphenol having 5 ethylene oxide and 4 butylene oxide adducts (line A-9) while not being tenaciously bound to the coal surface does show an extremely high permeability enhancement effects over a long period of time.

Figure 3:
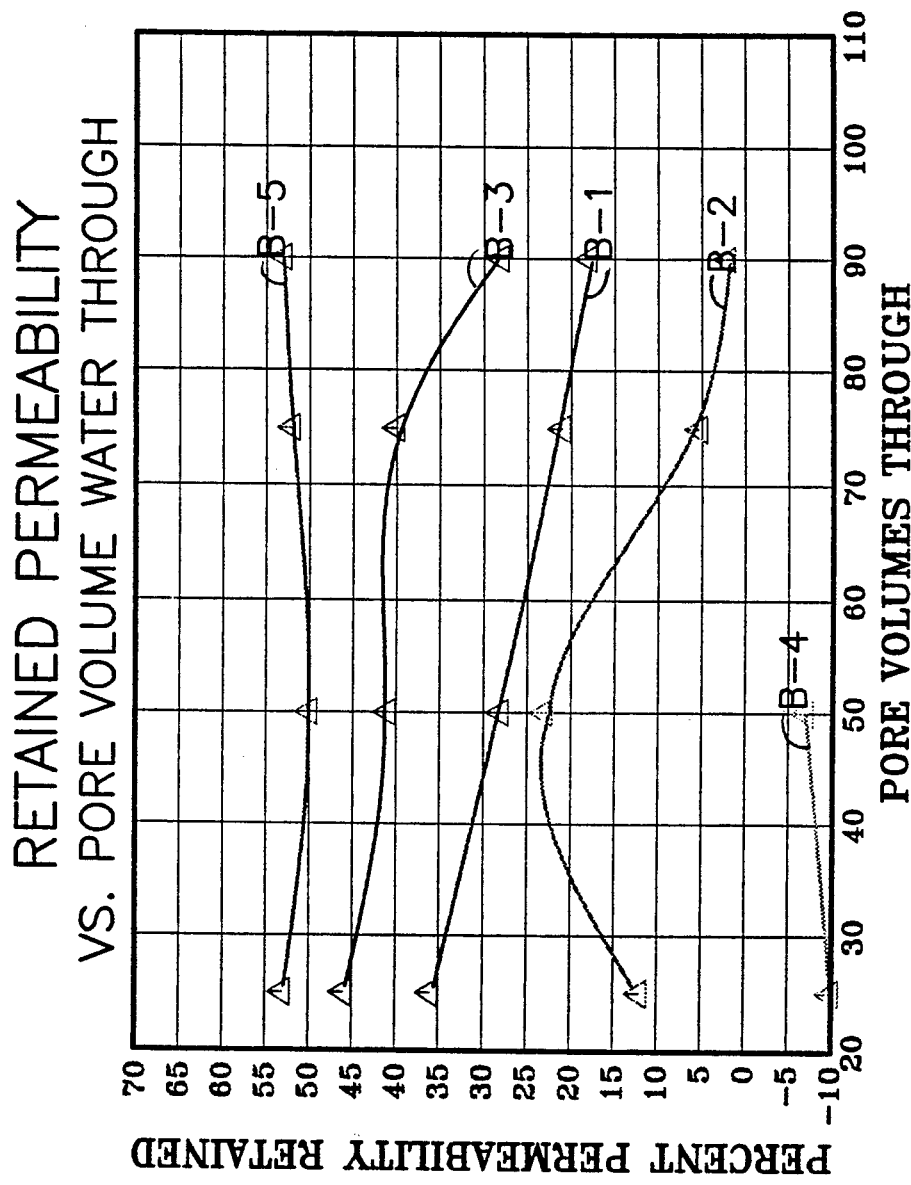

FIG. 3 illustrates the testing of four ethylene carbonate substituted alcohols against the same prior art fluorinated surfactant material (line B-1). Dodecanol having 20 ethylene carbonate adducts (line B-2) shows an initial low permeability enhancement with some increase and then a substantial fall off thereafter. Dodecanol having 5 ethylene carbonate adducts (line B-4) actually destroys permeability below that of a surfactant-free coal pack. Decanol having 10 ethylene carbonate adducts (line B-5) shows both high permeability and long-term retention of the material on the coal surface. Line B-3 of FIG. 3 illustrates the effects of a prior art sulfosuccinate surfactant shown to be effective in low pressure mineral dewatering processes to be somewhat effective in increasing initial permeability enhancement but showing substantial fall-off in permeability enhancement over time.

Figure 4:
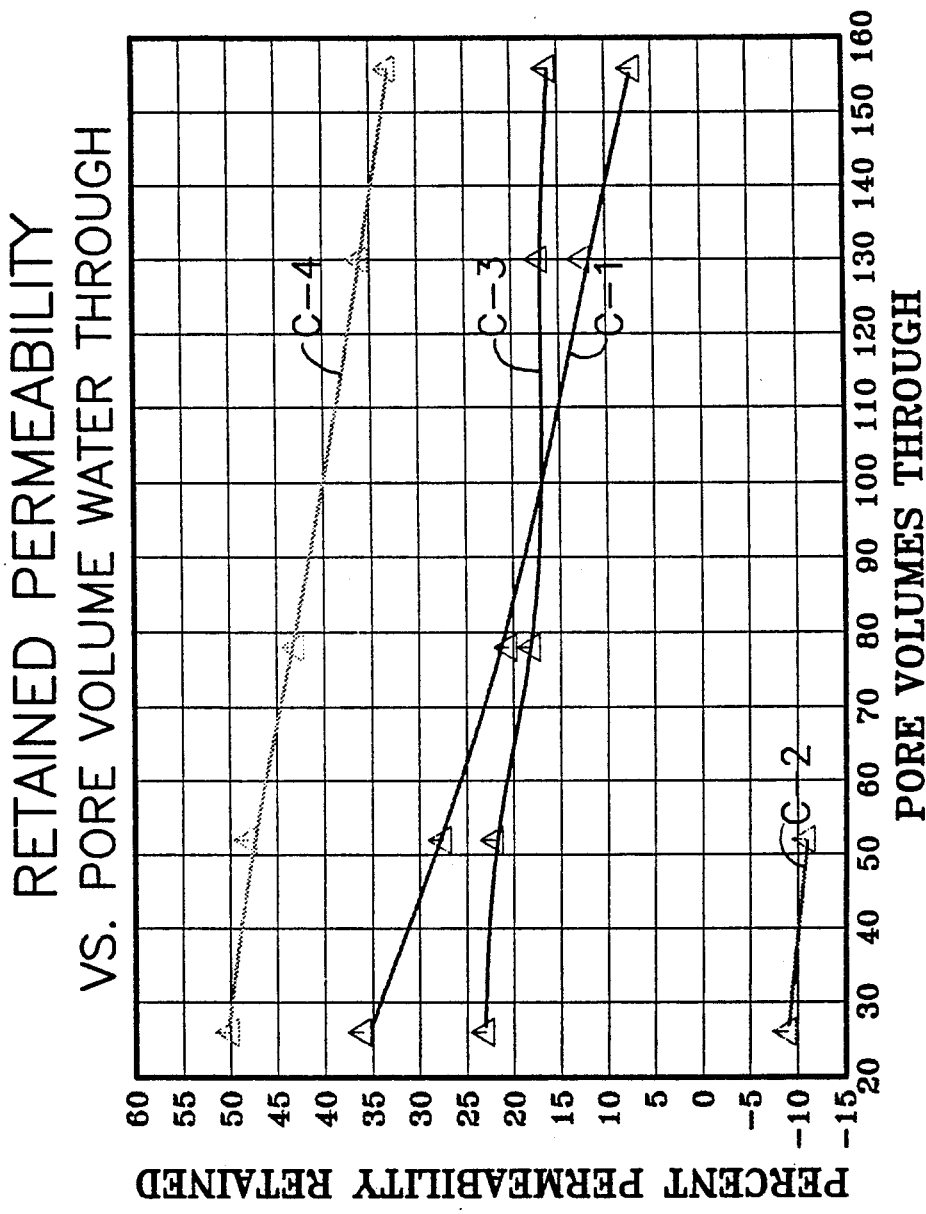

FIG. 4 illustrates the testing of three glycol-based materials having ethylene oxide and/or butylene oxide adducts. The prior art fluorinated surfactant standard system is illustrated by line C-1. A commercial mixture of diethyleneglycol monobutyl ether, triethyleneglycol monobutyl ether and higher glycol ethers having 9.5 butylene oxide adducts (line C-2) shows destruction of permeability over a surfactant-free system. The same commercial mixture of diethylene, triethylene and higher glycol ether mixtures having 4.2 ethylene oxide and 6 butylene oxide adducts (line C-3) shows acceptable permeability enhancement and good long-term retention of the surfactant on the coal surface. Triethyleneglycol monobutyl ether-formal (line C-4) shows excellent permeability enhancement and good long-term tenacity in retention on the coal surface.

Triethylene glycol monobutyl ether-formal has the following structure:

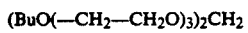

$(BuO(-CH_2-CH_2O)_3)_2CH_2$

Figure 5:
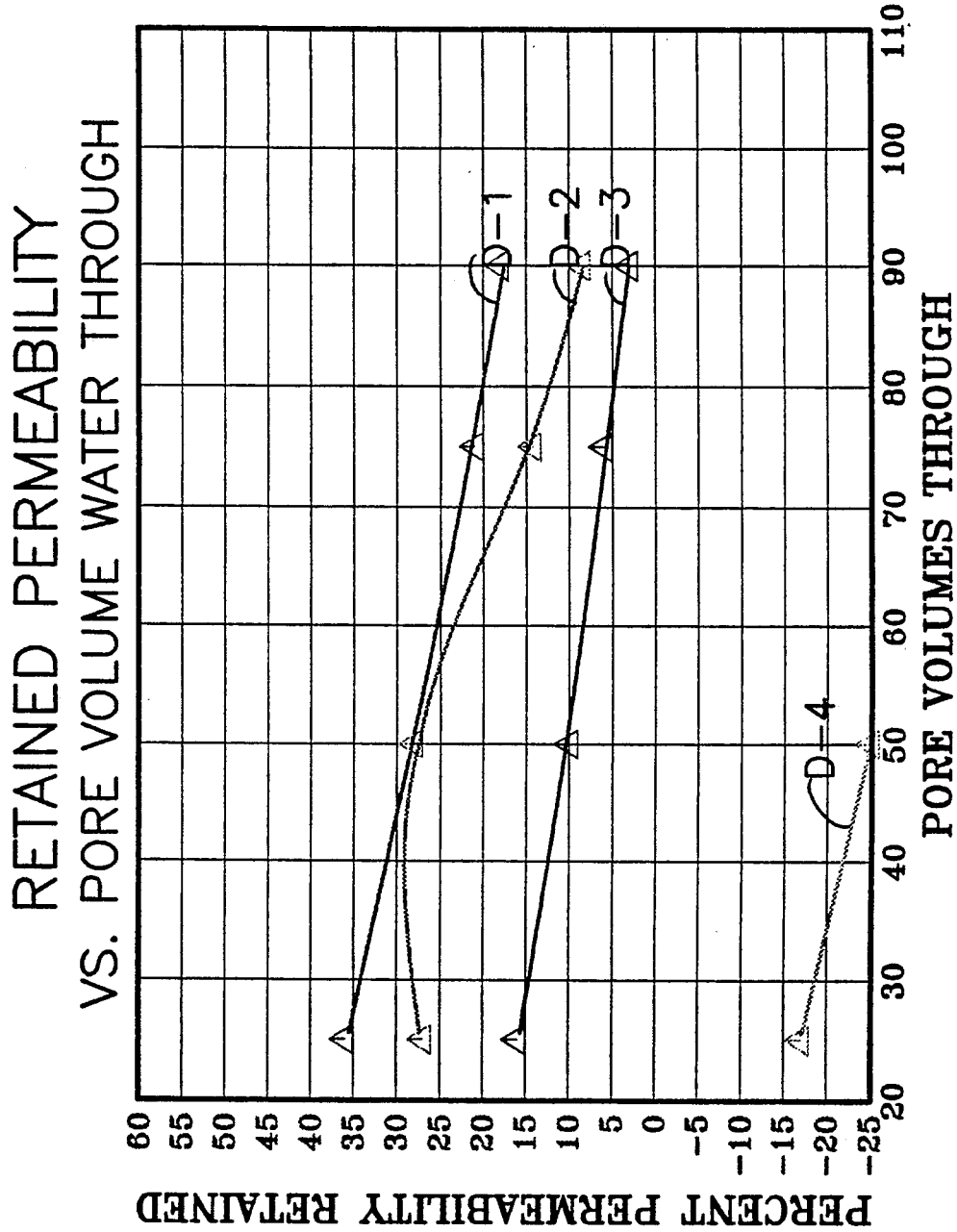

FIG. 5 illustrates that known prior art, dewatering aids used in the dewatering of coal or minerals in surface beneficiation processes can unexpectedly show undesirable effects when used in a pressurized environment such as is found in the process of dewatering a subterranean coal formation. Line D-1 represents the standard, prior art fluorinated surfactant illustrated in all of the other Figures. Line D-2, D-3 and D-4 represent the testing of dicocoamine acetate, dimethyldicoco ammonium chloride and a commercial dewatering aid of unknown composition sold by Chemlink as SR-8102, respectively. None of these materials show performance which would be at all acceptable in a dewatering aid for inclusion in a well treatment fluid for subterranean coal formations.

Figure 6:
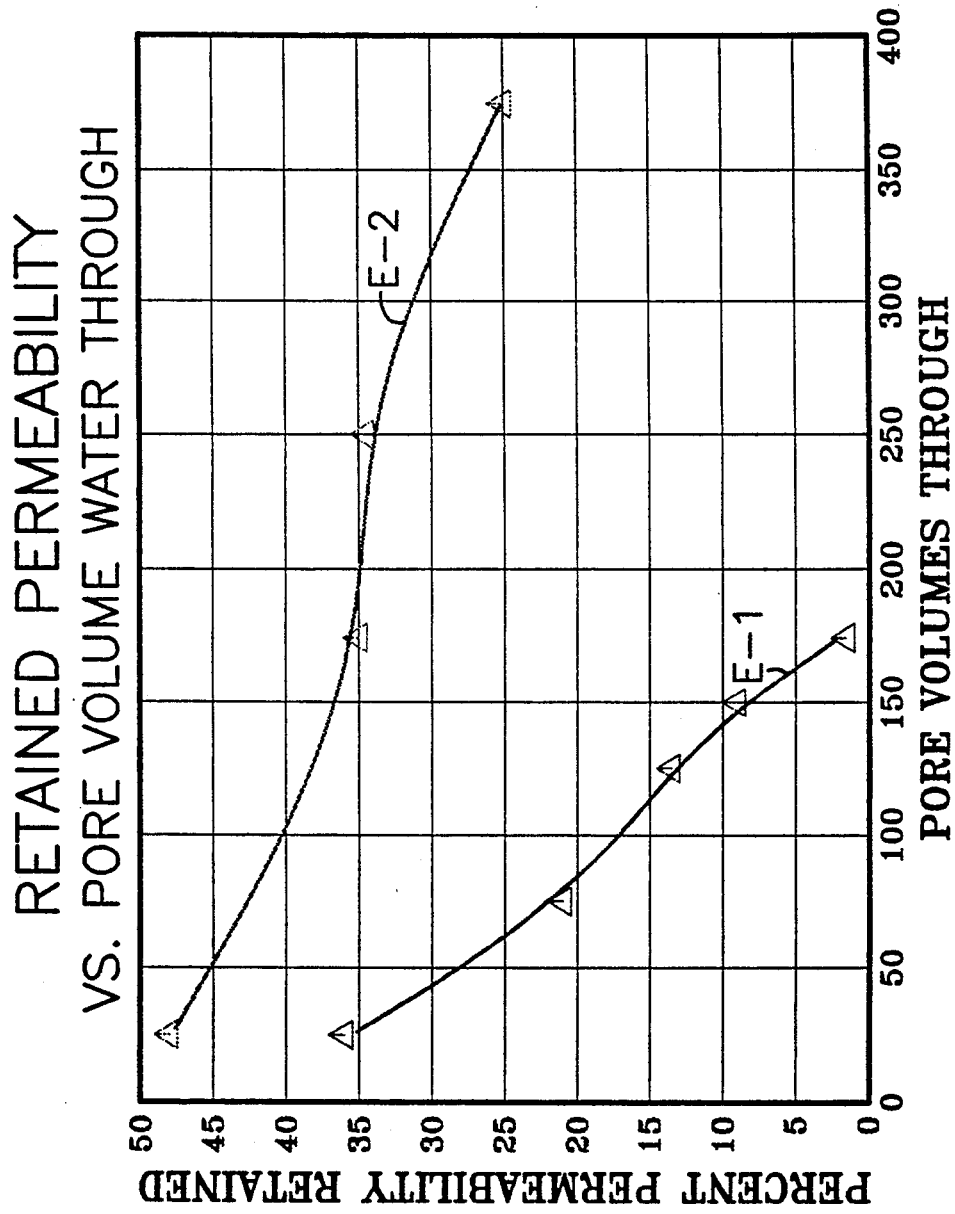

FIG. 6 illustrates the effects of extremely long-term use of the prior art standard fluorinated surfactant (line E-1) versus a preferred material comprising tridecyl alcohol having 7.5 ethylene oxide and 3.6 butylene oxide adducts (line E-2).

In fracturing a subterranean coal reservoir, the fracture is initiated using 1 to 4 gallons of a selected dewatering surfactant in accordance with the invention per 1000 gallons of water. The water may be neat or a brine and may also contain low amounts of a polymeric gelling agent. This stage has high water leak-off into the coal formation and primarily is intended to initiate the fracture and to place the initial quanitites of the dewatering surfactant in the formation. Following fracture initiation, additional fracturing fluid is pumped to attain wider fractures and contain higher polymer loadings (40 to 60 lbs per thousand gallons). The polymer may be either crosslinked or uncrosslinked. The fracturing fluid further includes 1 to 2 gallons of selected dewatering surfactant per 1000 gallons of fracturing fluid. In the proppant-carrying stage of the fracturing, the initial, low proppant-loaded fracturing fluids can contain 1 to 2 gallons of the selected surfactant per 1000 gallons of fracturing fluid. Little or no additional dewatering surfactant is provided in the later, higher proppant-loaded stages of the fracturing process.

The well treatment fluid of the present invention may also be used to enhance water and gas recovery from "poor" producers that have previously been fractured and propped or wells which contain some conductive drainage channels to the wellbore. In this treatment, water having little or no polymer loading is used to transport 2 to 4 gallons of the selected dewatering surfactant per 1000 gallons of fracturing fluid into the coal seam. This treatment is normally done at less than fracturing pressure to prevent dislodging the proppant that may be present in the fracture. The total volume of fluid containing the dewatering surfactant would depend on the coal seam height and the desired penetration of the dewatering surfactant.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the appended claims.

Having thus described our invention, we claim:

1. A method of dewatering coal in a subterranean formation penetrated by a wellbore comprising the steps of providing a well treatment fluid comprising an aqueous carrier fluid and an effective amount of a dewatering surfactant selected from a group consisting of:

(a) organic surfactant compounds having the formula

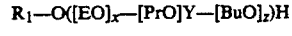

$R_1-O([EO]_x-[PrO]Y-[BuO]_z)H$ wherein $R_1$ is an alcohol, phenol or phenol derivative or a fatty acid having 1 to 16 carbon atoms; EO is an ethylene oxide radical and x is 1 to 20; PrO is a propylene oxide radical and y is 0 to 15 and BuO is butylene oxide radical and z is 1–15;

(b) an organic polyethylene carbonate having the formula

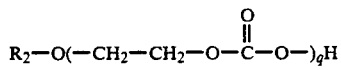

wherein $R_2$ is an alcohol having 7 to 16 carbon atoms and q is 7 to 16;

(c) butoxylated glycols having 1 to 15 butylene oxide groups, and (d) ethoxylated-butoxylated glycols having 1 to 5 ethylene oxide groups and 5 to 10 butylene oxide groups, and pumping the well treatment fluid into the formation through the wellbore into contact with the coal therein.

2. The method as set forth in claim 1 wherein the step of providing a well treatment fluid comprises providing a fluid further including a proppant and said step of pumping comprises pumping said well treatment fluid at a pressure sufficient to fracture the formation.

3. The method as set forth in claim 1 wherein the step of providing a well treatment fluid comprises providing a well treatment fluid further including a gelling agent.

4. The method as set forth in claim 1 wherein the step of providing a well treatment fluid comprises providing a well treatment fluid further including a gelling agent and a crosslinking agent for the gelling agent.

5. The method as set forth in claim 1 wherein the step of providing a well treatment fluid comprises providing a well treatment fluid further including a gelling agent and a gel breaker.

6. The method as set forth in claim 1 wherein the step of providing a well treatment fluid comprises providing a well treatment fluid further including a gelling agent, a crosslinking agent and a gel breaker.

* * * * *